(12) United States Patent
Asari

(10) Patent No.: US 8,564,803 B2
(45) Date of Patent: Oct. 22, 2013

(54) IMAGE FORMING APPARATUS, IMAGE FORMING SYSTEM, AND INFORMATION GENERATING METHOD

(75) Inventor: Kanako Asari, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 398 days.

(21) Appl. No.: 13/069,801

(22) Filed: Mar. 23, 2011

(65) Prior Publication Data

US 2011/0238951 A1 Sep. 29, 2011

Related U.S. Application Data

(60) Provisional application No. 61/318,461, filed on Mar. 29, 2010.

(51) Int. Cl.
| | |
|---|---|
| *G06F 15/76* | (2006.01) |
| *G06F 11/00* | (2006.01) |
| *G06F 15/16* | (2006.01) |
| *G06F 9/46* | (2006.01) |

(52) U.S. Cl.
USPC .......... 358/1.14; 712/34; 712/37; 714/2; 714/48; 709/206; 718/102

(58) Field of Classification Search
USPC ....... 358/1.14; 703/14; 712/32, 37; 714/48, 2
See application file for complete search history.

(56) References Cited

U.S. PATENT DOCUMENTS

| | | | | |
|---|---|---|---|---|
| 3,930,233 A | * | 12/1975 | Morley et al. | 703/14 |
| 5,481,698 A | * | 1/1996 | Itoh et al. | 714/48 |
| 7,577,822 B2 | * | 8/2009 | Vorbach | 712/34 |
| 2008/0288807 A1 | * | 11/2008 | Lyons et al. | 714/2 |

FOREIGN PATENT DOCUMENTS

| | | |
|---|---|---|
| JP | 08-307572 | 11/1996 |
| JP | 2004-233496 | 8/2004 |

* cited by examiner

*Primary Examiner* — Akwasi M Sarpong
(74) *Attorney, Agent, or Firm* — Turocy & Watson, LLP

(57) ABSTRACT

An image forming apparatus includes:
  plural processing units which execute plural processing functions that are different from each other;
  an execution-in-progress information acquiring unit which acquires execution-in-progress function information that is information about a first processing unit which is executing processing, of the plural processing units;
  a discrimination unit which discriminates a second processing unit that cannot execute processing when the first processing unit indicated by the execution-in-progress function information acquired by the execution-in-progress information acquiring unit is executing processing, from among the plural processing units; and
  an executability information generating unit which generates inexecutable function information that is information about the second processing unit, based on a result of determination by the discrimination unit.

14 Claims, 20 Drawing Sheets

FIG. 4

|  |  | DATA IDENTIFICATION ID |
|---|---|---|
| Copy | ☐ |  |
| Print | ☑ | EEE. FFF. |
| Scan | ☐ |  |
| FAX | ☐ |  |

FIG. 5

| FUNCTION BEING EXECUTED | FUNCTION WHICH USER WANTS TO USE | | | |
|---|---|---|---|---|
| | Copy | Print | Scan | FAX |
| Copy | ● | — | — | — |
| Print | — | ● | ○ | ○ |
| Scan | — | ○ | ● | — |
| FAX | — | ○ | — | ● |

○ : OPERABLE      ● : INOPERABLE BECAUSE THIS FUNCTION IS IN USE

— : INOPERABLE BECAUSE ANOTHER FUNCTION IS IN USE

FIG. 6

| MACHINE NAME | TYPE OF OPERATION | OPERABILITY | NOTE |
|---|---|---|---|
| 100 MANAGEMENT TOP | Copy | ◯ | |
| | Print | ◯ | |
| | Scan | ◯ | |
| | FAX | ◯ | |

NOTICE: [　　　　　　　　　　　　　　　　]

◯ : OPERABLE  ● : INOPERABLE BECAUSE THIS FUNCTION IS IN USE

━ : INOPERABLE BECAUSE ANOTHER FUNCTION IS IN USE

FIG. 7

| MACHINE NAME | TYPE OF OPERATION | OPERABILITY | NOTE |
|---|---|---|---|
| 100 MANAGEMENT TOP | Copy | — | |
| | Print | ● | |
| | Scan | ○ | |
| | FAX | ○ | |

NOTICE:

○ : OPERABLE  ● : INOPERABLE BECAUSE THIS FUNCTION IS IN USE

— : INOPERABLE BECAUSE ANOTHER FUNCTION IS IN USE

FIG. 12

| MACHINE NAME | TYPE OF OPERATION | OPERABILITY | NOTE |
|---|---|---|---|
| 100 MANAGEMENT TOP | Copy | ○ | |
| | Print | ○ | |
| | Scan | ○ | |
| | FAX | ○ | |
| 400 MANAGEMENT TOP | Copy | ○ | |
| | Print | ○ | |
| | Scan | ○ | |
| | FAX | ○ | |
| 500 MANAGEMENT TOP | Copy | ○ | |
| | Print | ○ | |
| | Scan | ○ | |
| | FAX | ○ | |

NOTICE :

○ : OPERABLE  ● : INOPERABLE BECAUSE THIS FUNCTION IS IN USE

━ : INOPERABLE BECAUSE ANOTHER FUNCTION IS IN USE

FIG. 15

| MACHINE NAME | TYPE OF OPERATION | OPERABILITY | NOTE |
|---|---|---|---|
| 100<br>MANAGEMENT TOP | Copy | — | EXECUTABLE FIRST |
| | Print | ● | |
| | Scan | ○ | |
| | FAX | ○ | |
| 400<br>MANAGEMENT TOP | Copy | — | |
| | Print | ● | |
| | Scan | ○ | |
| | FAX | ○ | |
| 500<br>MANAGEMENT TOP | Copy | — | |
| | Print | ● | |
| | Scan | ○ | |
| | FAX | ○ | |

NOTICE: [                    ]

○ : OPERABLE    ● : INOPERABLE BECAUSE THIS FUNCTION IS IN USE

— : INOPERABLE BECAUSE ANOTHER FUNCTION IS IN USE

FIG. 18

| MACHINE NAME | TYPE OF OPERATION | OPERABILITY | NOTE |
|---|---|---|---|
| 100<br>MANAGEMENT TOP | Copy | — | EXECUTABLE IN 20 SECONDS |
| | Print | ● | |
| | Scan | ○ | |
| | FAX | ○ | |

NOTICE:

○ : OPERABLE   ● : INOPERABLE BECAUSE THIS FUNCTION IS IN USE

— : INOPERABLE BECAUSE ANOTHER FUNCTION IS IN USE

FIG. 19

| MACHINE NAME | TYPE OF OPERATION | OPERABILITY | NOTE |
|---|---|---|---|
| 100<br>MANAGEMENT TOP | Copy | — | EXECUTABLE FIRST |
| | Print | ● | EXECUTABLE FIRST |
| | Scan | ○ | |
| | FAX | ○ | |
| 400<br>MANAGEMENT TOP | Copy | — | |
| | Print | ● | |
| | Scan | ○ | |
| | FAX | ○ | |
| 500<br>MANAGEMENT TOP | Copy | — | |
| | Print | ● | |
| | Scan | ○ | |
| | FAX | ○ | |

NOTICE: [                    ]

○ : OPERABLE  ● : INOPERABLE BECAUSE THIS FUNCTION IS IN USE

— : INOPERABLE BECAUSE ANOTHER FUNCTION IS IN USE

FIG. 20

| TYPE OF OPERATION | NAME OF MACHINE THAT CAN EXECUTE FIRST |
|---|---|
| Copy | 100 |
| Print | 100 |
| Scan | ANY MACHINE CAN BE EXECUTED |
| FAX | ANY MACHINE CAN BE EXECUTED |

IMAGE FORMING APPARATUS, IMAGE FORMING SYSTEM, AND INFORMATION GENERATING METHOD

CROSS-REFERENCE TO RELATED APPLICATION

This application is based upon and claims the benefit of priority from U.S. provisional application 61/318,461, filed on Mar. 29, 2010; the entire contents of which are incorporated herein by reference.

FIELD

Embodiments described herein relate generally to a technique for an image forming apparatus that can execute plural kinds of functional processing which are different from each other.

BACKGROUND

An image forming apparatus that can execute plural processing functions which are different from each other is known. Such an apparatus may be, for example, what is called an MFP (multi-function peripheral).

Here, in some cases, when an MFP or the like is requested to execute functional processing from a certain PC (personal computer) or the like via a network, the same functional processing as that functional processing based on a request from another PC or the like is being executed, or the functional processing that the MFP is requested to execute cannot be executed because of the influence of the fact that another functional processing is being executed. Conventionally, in such situations, it is difficult for the user to grasp the execution status of the MFP that is the target of the execution request of the processing. Therefore, in order to request the execution of the processing irrespective of the execution status of the MFP of the target and execute the desired processing, the user has no choice but to wait until the other functional processing ends that is being executed.

DESCRIPTION OF THE DRAWINGS

FIG. 4 shows an example of an execution status table according to the first embodiment.

FIG. 5 shows an example of an executability correspondence table according to the first embodiment.

FIG. 6 shows an example of executability information according to the first embodiment.

FIG. 7 shows an example of executability information according to the first embodiment.

FIG. 12 shows an example of executability list information according to the second embodiment.

FIG. 15 shows an example of executability list information according to the third embodiment.

FIG. 18 shows an example of executability information according to another embodiment.

FIG. 19 shows an example of executability list information according to another embodiment.

FIG. 20 shows an example of displaying of prediction results included in executability list information according to another embodiment.

DETAILED DESCRIPTION

First Embodiment

An image forming apparatus according to a first embodiment has plural processing units, an execution-in-progress information acquiring unit, a discrimination unit, and an executability information generating unit. The plural processing units execute plural processing functions which are different from each other. The execution-in-progress information acquiring unit acquires execution-in-progress function information that is information about a first processing unit which is executing processing, of the plural processing units. The discrimination unit discriminates a second processing unit that cannot execute processing when the first processing unit indicated by the execution-in-progress function information acquired by the execution-in-progress information acquiring unit is executing processing, from among the plural processing units. The executability information generating unit generates inexecutable function information that is information about the second processing unit, based on a result of determination by the discrimination unit.

Figure 1:
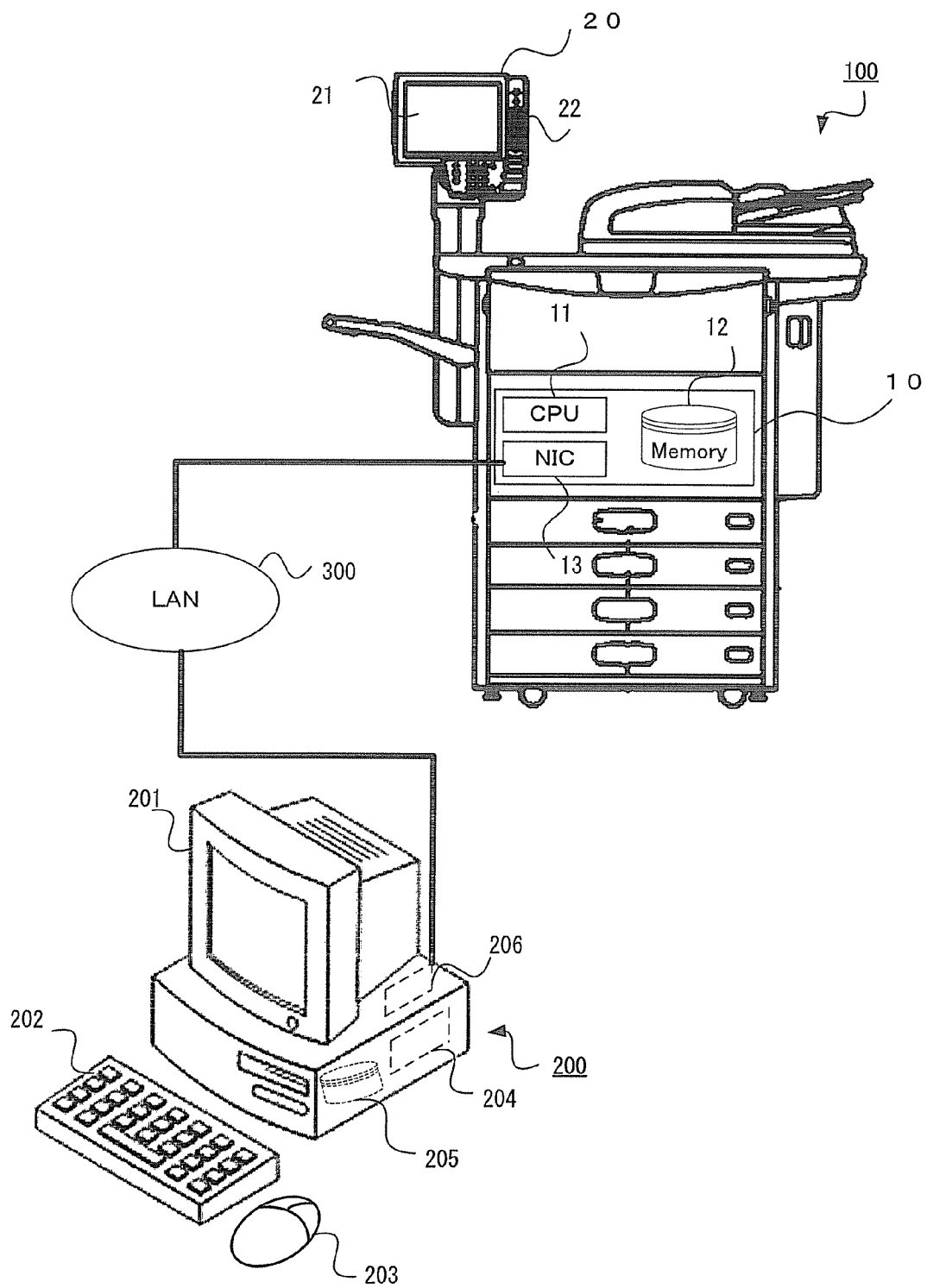
FIG. 1 schematically shows an image forming system according to a first embodiment.

Hereinafter, an image forming system according to the first embodiment will be described with reference to the drawings. First, FIG. 1 shows the configuration of the system of the first embodiment. The system of the first embodiment includes an image forming apparatus 100 and a PC 200 which are connected with each other and can communicate with each other via a LAN 300. The image forming apparatus 100 has a control board 10 that centrally controls hardware devices within the apparatus. The control board 10 has a CPU 11, which is an operation processing device, and has a memory 12 including a RAM (random access memory), which is a volatile storage device, a ROM (read only memory), which is a non-volatile storage device, and an HDD (hard disk drive).

The control board 10 may have an ASIC (application specific integrated circuit). As a matter of course, the CPU 11 can be replaced by an MPU (micro processing unit) that can execute equivalent operation processing. Moreover, the HDD constituting the memory 12 can similarly be replaced by a storage device such as a flash memory.

The control board 10 also has a NIC (network interface card) 13 which controls communication with the outside. The image forming apparatus 100 has a control panel 20 including a keyboard 22 on which instructions from the user are accepted and a touch panel display 21 which displays control contents and on which instruction from the user are accepted.

The hardware configuration of the PC 200 is similar to any existing PC. The PC 200 has a CPU 204, a memory 205, and a NIC 206. The PC 200 also has an input unit including a keyboard 202 and a mouse 203 with which inputs from the user are accepted, and an output unit including a monitor 201 which displays images to the user. The NIC 13 and the NIC 206 carry out communication control with each other via the LAN 300.

In the PC 200, the CPU 204 executes an application program stored, for example, in the memory 205 or the like, and thus can create and correct a document. Moreover, the PC 200 generates job data and transmits the job data to the image forming apparatus 100, and thus can cause the image forming apparatus 100 to execute functional processing. For example, with processing using a printer driver installed as a program, the PC 200 generates print job data for a document created or processed otherwise by an application. The job data includes meta data such as a processing execution request, creation date of the document, and identification ID of the job data, as well as data of the document. The PC 200 then transmits the print job data to the image forming apparatus 100 and causes the image forming apparatus 100 to execute print of the document that is created or processed otherwise.

The image forming apparatus 100 can execute plural different kinds of functional processing. The image forming apparatus 100 has, for example, a monochrome or color copy function, a monochrome or color scanner function, and a monochrome or color printer function, and so on. The image forming apparatus 100 is configured to be able to transmit a scanned image via e-mail to a desired address, or save a scanned image and exchange image data via a network, or realize the functions of network printer and FAX, by connecting a network. In the following description, to facilitate understanding, the functional processing executable by the image forming apparatus 100 includes print, copy, scan, and FAX.

In the first embodiment, information about the use status of the image forming apparatus 100 can be confirmed on the PC 200.

Figure 2:
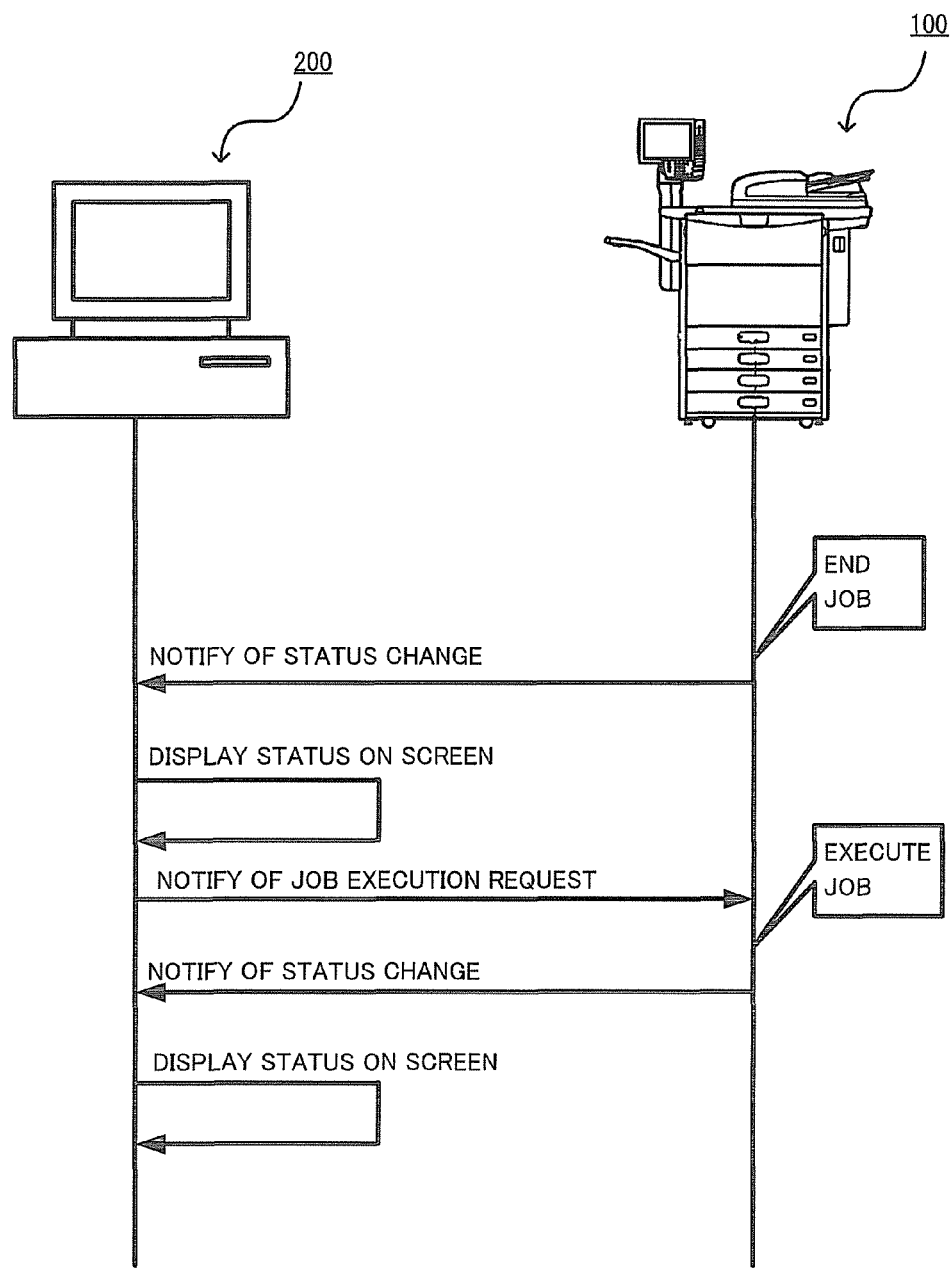
FIG. 2 shows an example of communication in the image forming system according to the first embodiment.

As shown in FIG. 2, for example, when a job that is being executed in the image forming apparatus 100 is ended, the image forming apparatus 100 generates information about the execution status of processing (executability information which will be described later) and notifies the PC 200 that the information is generated, via the LAN 300 (notify of status change). Based on the notification, the PC 200 acquires information about the use status generated by the image forming apparatus 100 via the LAN 300 and displays the information on the monitor 201.

Meanwhile, when a job execution request is transmitted by the PC 200 to the image forming apparatus 100 according to a user's instruction or the like, the image forming apparatus 100 executes the job, and also newly generates information about the use status and notifies the PC 200 that the information is generated, via the LAN 300. Based on the notification, the PC 200 acquires the information about the use status generated by the image forming apparatus 100 via the LAN 300 and displays the information on the monitor 201.

Next, functional blocks related to the generation of executability information in the first embodiment will be described with reference to FIG. 3.

Figure 3:
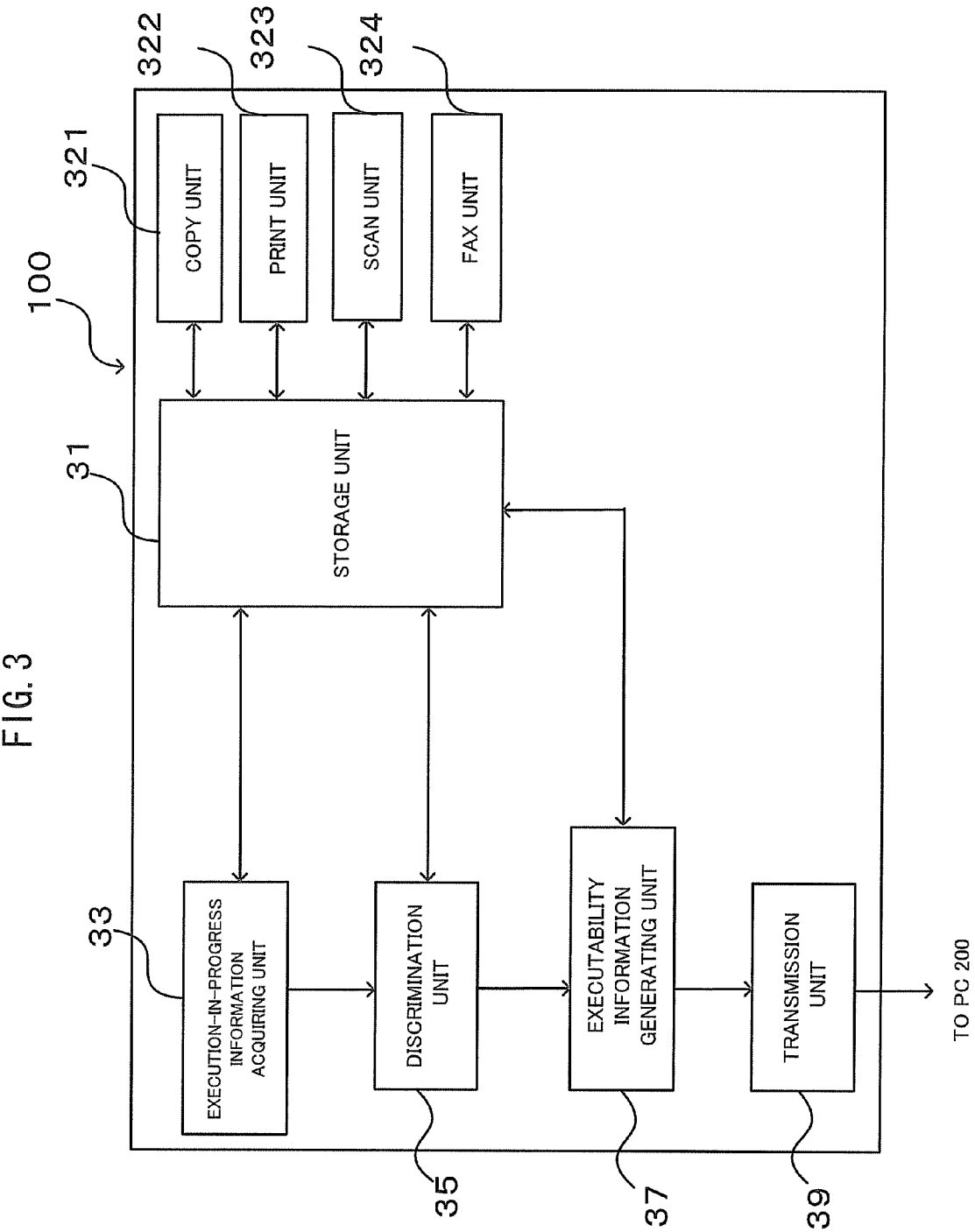
FIG. 3 shows functional blocks related to generation of executability information according to the first embodiment.

As shown in FIG. 3, the image forming apparatus 100 has a storage unit 31, an execution-in-progress information acquiring unit 33, a discrimination unit 35, an executability information generating unit 37, and a transmission unit 39. The image forming apparatus 100 also has a copy unit 321, a print unit 322, a scan unit 323 and a FAX unit 324 as processing units which control execution of each functional processing. Each functional block can be realized, for example, by the CPU 11 executing a program read out in the memory 12.

In the storage unit 31, job data stored as a record (log), an execution status table shown as an example in FIG. 4, an executability correspondence table (equivalent to executability correspondence information) shown as an example in FIG. 5, executability information generated by the executability information generating unit 37, and the like are stored.

Of these, the execution status table shows the correspondence between each processing unit and the execution status of processing. In the first embodiment, when the copy unit 321, the print unit 322, the scan unit 323 and the FAX unit 324 execute their respective processing and end the execution, the execution status table stored in the storage unit 31 becomes updated. As shown in FIG. 4, the execution status table may include information to specify job data to be executed (for example, identification ID of job data to be executed).

The executability correspondence table shown as an example in FIG. 5 also shows the correspondence between a predetermined processing unit, and a processing unit that cannot execute processing and a processing unit that can execute processing when the predetermined processing unit is executing processing. The correspondence may differ from one image forming apparatus to another depending on the processing capacity and the functions provided.

The execution-in-progress information acquiring unit 33 acquires execution-in-progress function information that is information about a processing unit that is executing processing (hereinafter also referred to as a first processing unit), of the plural processing units, based on the execution status table stored in the storage unit 31.

The acquisition of execution-in-progress function information by the execution-in-progress acquiring unit 33 may also be carried out, for example, in response to a notification of update of the execution status table stored in the storage unit 31 from the image forming apparatus 100 (more specifically, from a processing unit provided in the image forming apparatus 100). The acquisition may also be carried out at predetermined time intervals or may be carried out in response to a request from the PC 200.

The discrimination unit 35 discriminates a processing unit (hereinafter also referred to as a second processing unit) which cannot execute processing when the first processing unit indicated by the execution-in-progress function information acquired by the execution-in-progress information acquiring unit 33 is executing processing, from among the plural processing units in the image forming apparatus 100. The discrimination unit 35 carries out the discrimination of the second processing unit, using the execution-in-progress function information acquired by the execution-in-progress acquiring unit 33 and the executability correspondence table stored in the storage unit 31. Moreover, the discrimination unit 35 discriminates a processing unit (hereinafter also referred to as a third processing unit) which can execute processing when the first processing unit is executing processing, from among the plural processing units provided in the image forming apparatus, using the execution-in-progress function information and the executability correspondence table.

For example, it is now assumed that the execution-in-progress function information indicates the print unit 322. Here, the copy unit 321 is discriminated as a second processing unit which cannot execute processing, based on the executability correspondence table. Meanwhile, the scan unit 323 and the FAX unit 324 are discriminated as third processing units which can execute processing even when the print unit 322 is executing processing.

The discrimination unit 35 transmits the result of the discrimination and the execution-in-progress function information to the executability information generating unit 37.

The executability information generating unit 37 generates executability information including inexecutable function information that is information about processing by the second processing unit and executable function information that is information about processing by the third processing unit, based on the result of the discrimination by the discrimination unit 35. The executability information generating unit 37 generates the executability information, for example, in the HTML format and stores the information in the storage unit 31. In the first embodiment, the executability information including the execution-in-progress function information acquired from the discrimination unit 35 is generated.

For example, it is now assumed that no processing units in the image forming apparatus 100 are executing processing. Here, the executability information generating unit 37 generates, for example, executability information as shown in FIG. 6. Meanwhile, it is also assumed that copy processing is being executed in the image forming apparatus 100. Here, the executability information generating unit 37 generates, for example, executability information as shown in FIG. 7, based on the executability correspondence table.

The transmission unit 39 notifies the PC 200 that the executability information is generated by the executability information generating unit 37. Based on the notification from the transmission unit 39, the PC 200 acquires the executability information in the HTML format stored in the storage unit 31 via the network and displays the executability information on the monitor 201. As the information about processing by the third processing unit (information indicating processing that can be executed) is presented in addition to the information about processing by the second processing unit (information indicating processing that cannot be executed), the user can have options such as changing the order of processing to be executed. Thus, further convenience to the user can be provided.

Figure 8:
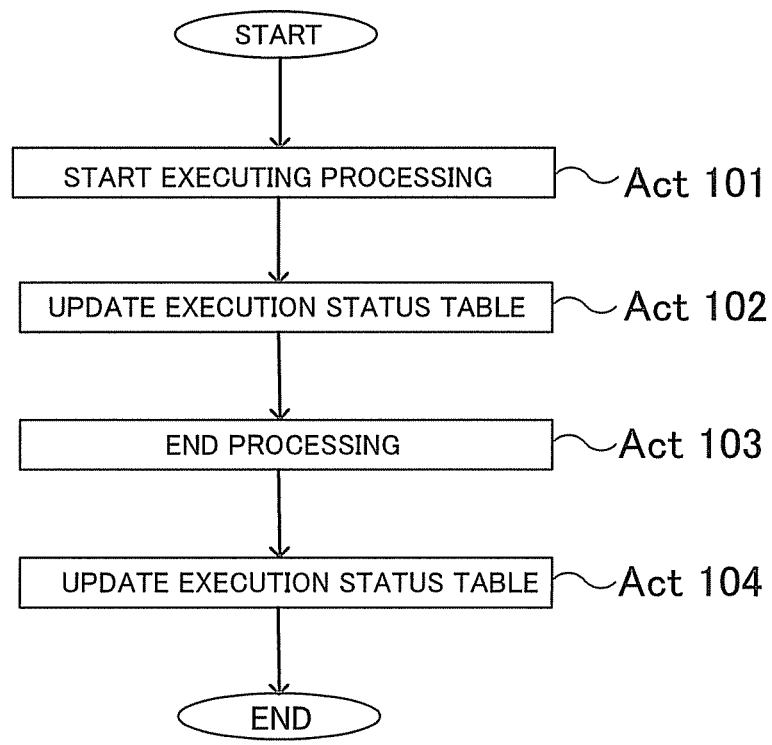
FIG. 8 shows a processing flow of execution of processing by a processing unit according to the first embodiment.

Next, a processing flow of execution of processing by the processing units provided in the image forming apparatus 100 will be described with reference to FIG. 8. To facilitate understanding, an example where the image forming apparatus 100 acquires print job data including a print processing execution request from the PC 200 will be described. The other processing units similarly carry out processing based on job data including a processing execution request from the PC 200 or job data created in the image forming apparatus 100 in response to an instruction input from the user via the control panel 20.

In ACT 101, when a processing execution request is acquired from the PC 200, the print unit 322 starts print processing of a document as a print target included in print job data.

Next, in ACT 102, the print unit 322 updates the execution status table stored in the storage unit 31 so that the table shows that print processing is being executed (the box corresponding to print processing is checked). The print unit 322 also includes the name of job data as a print target into the execution status table.

In ACT 103, the print unit 322 detects that the entire document as a processing target is printed (the end of print processing).

In ACT 104, the print unit 322 updates the execution status table stored in the storage unit 31 so that the table indicates that print processing is not being executed (the box corresponding to print processing is unchecked).

Figure 9:
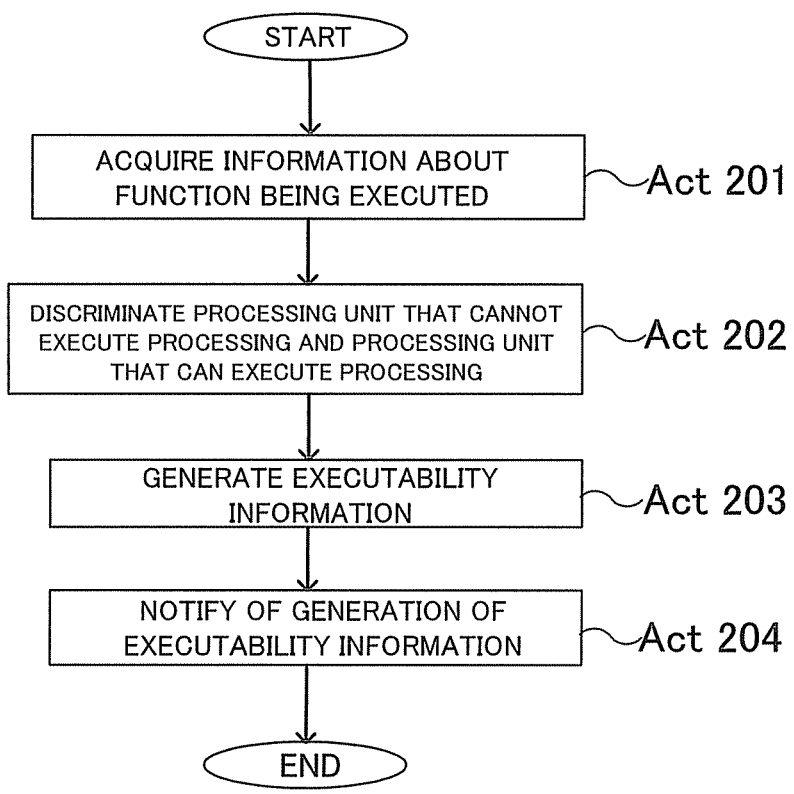
FIG. 9 shows a processing flow in generation of executability information in the first embodiment.

Next, a processing flow of the generation of executability information will be described with reference to FIG. 9.

First, in ACT 201, the execution-in-progress information acquiring unit 33 acquires execution-in-progress function information based on the execution status table stored in the storage unit 31. The execution-in-progress information acquiring unit 33 transmits the acquired execution-in-progress function information to the discrimination unit 35.

In ACT 202, the discrimination unit 35 discriminates a processing unit that cannot execute processing (second processing unit) and a processing unit that can execute processing (third processing unit) from among the processing units (print unit, copy unit, scan unit and FAX unit) provided in the image forming apparatus, using the acquired execution-in-progress function information and the executability correspondence table stored in the storage unit 31. The discrimination unit 35 transmits the result of the discrimination to the executability information generating unit 37.

In ACT 203, the executability information generating unit 37 generates executability information based on the result of the discrimination that is acquired. The executability information generating unit 37 stores the generated executability information in the storage unit 31. The executability information generating unit 37 also notifies the transmission unit 39 that the executability information is generated.

In ACT 204, the transmission unit 39 notifies the PC 200 that the executability information is generated, based on the notification from the executability information generating unit 37.

Thus, according to the first embodiment, when the image forming apparatus is executing certain functional processing, processing that cannot be executed because of the execution of that certain functional processing in progress can be confirmed.

Second Embodiment

Next, a second embodiment will be described. The parts of the configuration that are common to the first and second embodiments are denoted by the same reference numerals and will not be described further in detail (the same applies to the subsequent embodiments).

Figure 10:
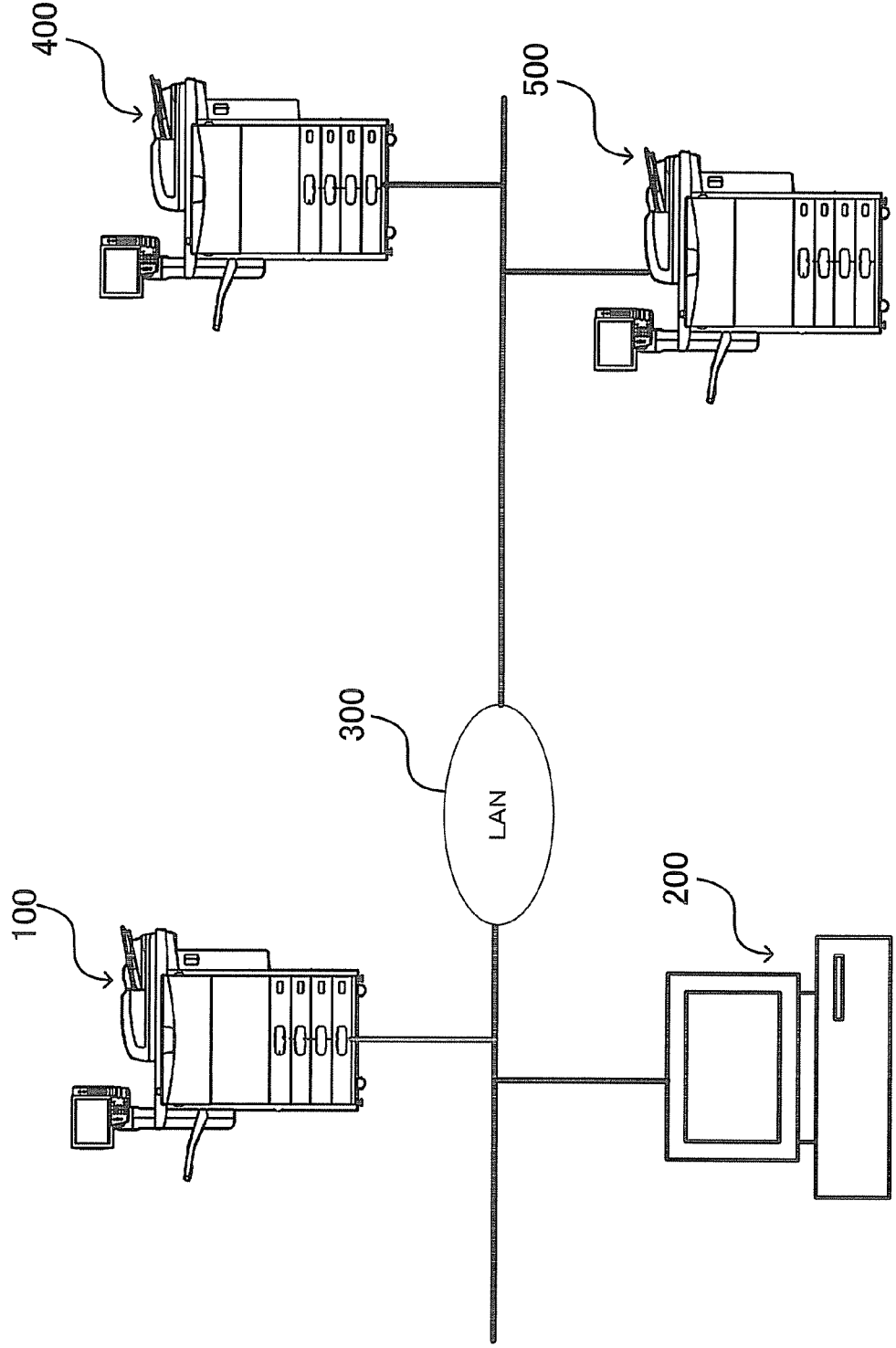
FIG. 10 schematically shows an image forming system according to a second embodiment.

As shown in FIG. 10, an image forming system according to the second embodiment includes plural image forming apparatuses connected to be able to communicate with the PC 200 via a network such as the LAN 300. Here, to facilitate understanding, an example where the image forming apparatuses 100, 400 and 500 are provided is described.

Figure 11:
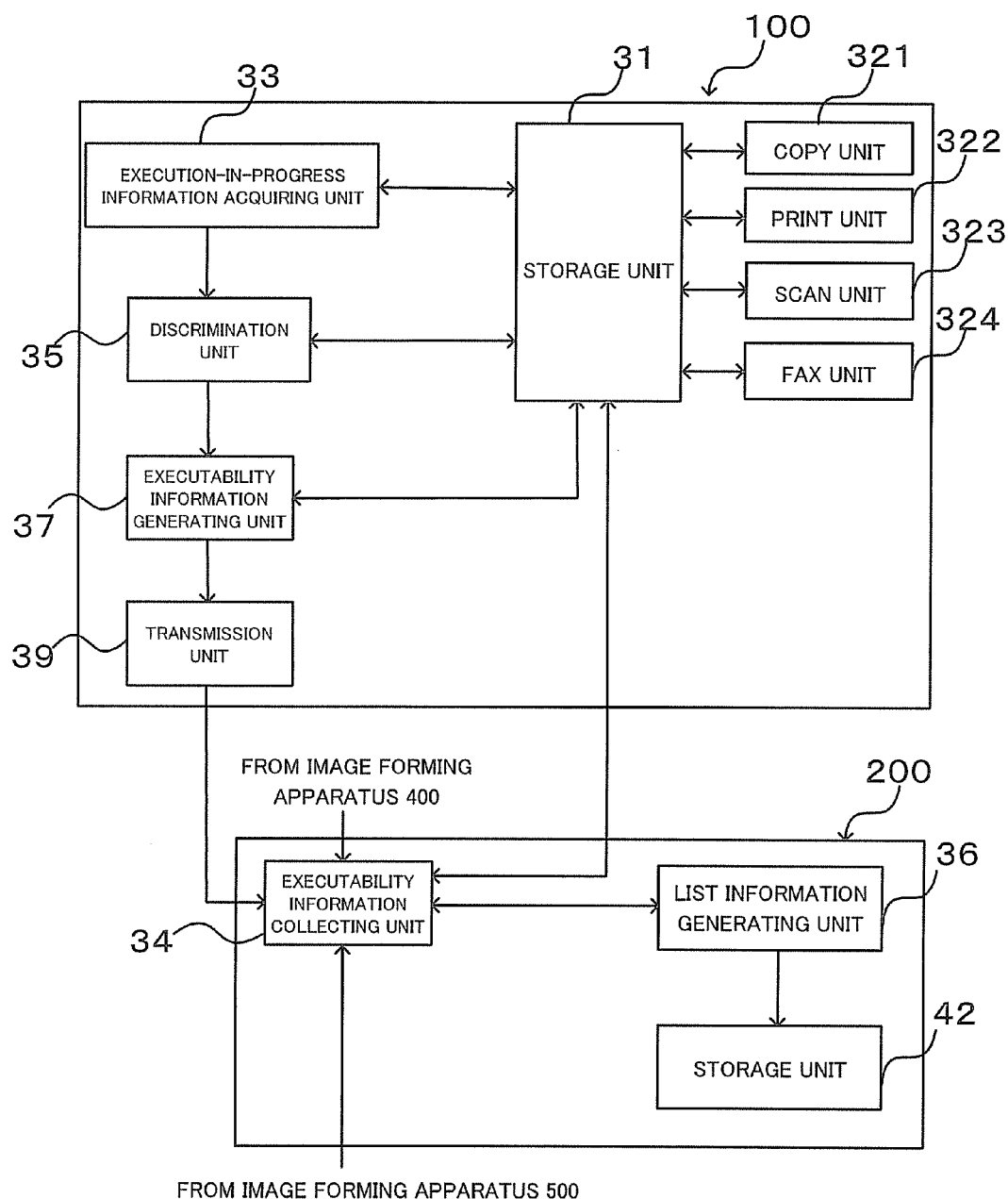
FIG. 11 shows functional blocks related to generation of executability list information according to the second embodiment.

FIG. 11 shows functional blocks related to the generation of executability list information in the second embodiment.

As shown in FIG. 11, the system of the second embodiment has an information collecting unit 34 (equivalent to the executability information collecting unit), a list information generating unit 36, and a storage unit 42. In the second embodiment, each of the image forming apparatuses 100, 400 and 500 has the storage unit 31, the execution-in-progress information acquiring unit 33, the discrimination unit 35, the executability information generating unit 37 and the transmission unit 39 shown in FIG. 3. Each of the image forming apparatuses 100, 400 and 500 has the copy unit 321, the print unit 322, the scan unit 323 and the FAX unit 324 as processing units.

That is, in the second embodiment, the execution-in-progress information acquiring unit 33 acquires execution-in-progress function information which is information about a processing unit (first processing unit) that is executing processing, from among the plural processing units, in association with each image forming apparatus. The discrimination unit 35 discriminates, for each image forming apparatus, a processing unit (second processing unit) that cannot execute processing when the first processing unit indicated by the execution-in-progress function information acquired by the execution-in-progress information acquiring unit 33 is executing processing and a processing unit (third processing unit) that can execute processing while the first processing unit is executing processing, from among the plural processing units provided in each image forming apparatus. The executability information generating unit 37 generates executability information including inexecutable function information which is information about the second processing unit and executable function information which is information about the third processing unit, in association with each image forming apparatus, based on the result of the determination by the discrimination unit 35.

In FIG. 11, the image forming apparatuses 100, 400 and 500 have common functional blocks. Therefore, only the functional blocks provided in the image forming apparatus 100 are described and the description of the functional blocks provided in the image forming apparatuses 400 and 500 is omitted.

The information collecting unit 34 collects the executability information for each of the plural image forming apparatuses generated by the executability information generating unit 37 in the PC 200.

The list information generating unit 36 generates executability list information using inexecutable processing information and executable processing information included in the executability information for each image forming apparatus collected by the information collecting unit 34. The executability list information shows the image forming apparatuses, the processing by the second processing unit in each image forming apparatus and the processing by the third processing unit in each image forming apparatus, in association with each other. The executability list information can be configured, for example, as shown in FIG. 12.

In the storage unit 42, for example, the executability list information generated by the list information generating unit 36 is stored.

Figure 13:
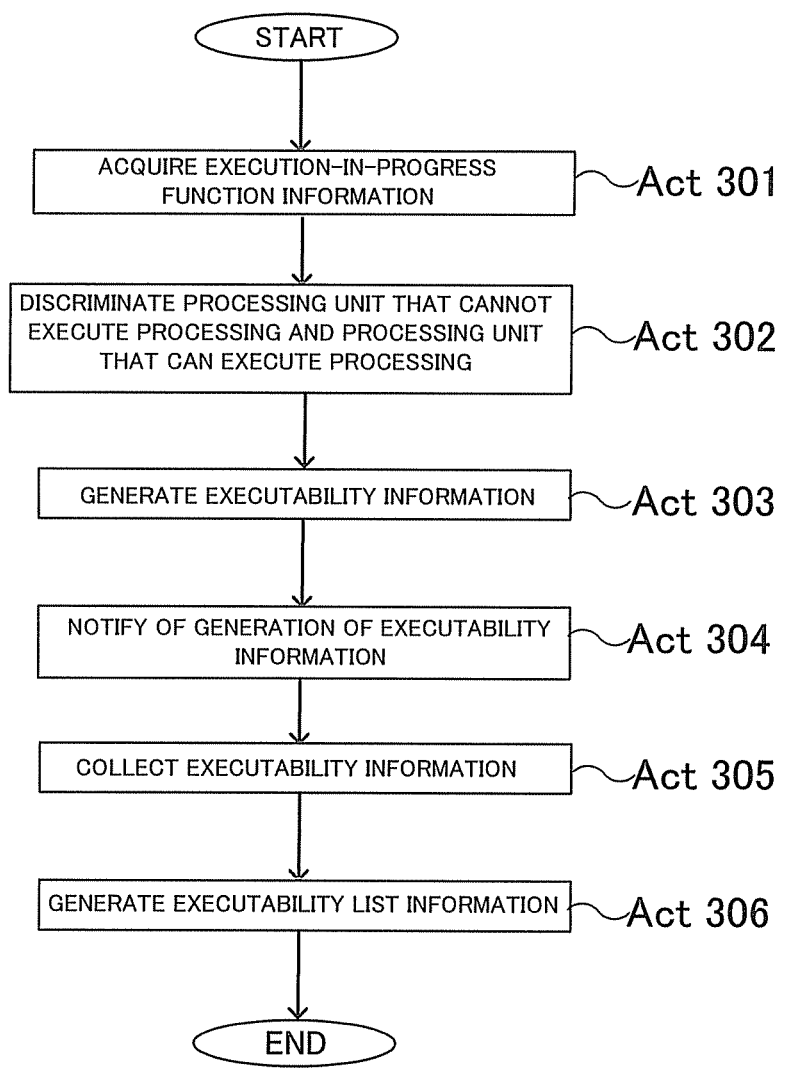
FIG. 13 shows a processing flow in generation of executability list information in the second embodiment.

FIG. 13 shows a processing flow related to the generation of executability list information in the second embodiment. The processing flow related to the update of the use status table is the same as in the first embodiment and therefore will not be described (the same applies to the third embodiment). The processing in ACT 301 to ACT 304 is the same as ACT 201 to ACT 204 in the first embodiment and therefore will not be described further in detail. In the second embodiment, the processing of ACT 301 to ACT 304 is executed by each image forming apparatus (image forming apparatuses 100, 400 and 500) in the system.

In ACT 305, the information collecting unit 34 collects the executability information stored in the storage unit 31 of each of the image forming apparatuses 100, 400 and 500, based on the notification from the transmission unit 39. The executability information collecting unit 34 transmits the collected executability information of each image forming apparatus to the list information generating unit 36.

In ACT 306, the list information generating unit 36 generates executability list information shown as an example in FIG. 12, based on the executability information of each of the image forming apparatuses 100, 400 and 500 acquired from the information collecting unit 34. The generated executability list information is displayed on the monitor 201 and thus presented to the user.

Thus, according to the second embodiment, when the image forming apparatus is executing certain functional processing, processing that cannot be executed because of the fact that the certain functional processing is being executed can be confirmed for plural image forming apparatuses. The user can select an image forming apparatus to execute desired processing, based on the executability list information.

Third Embodiment

Figure 14:
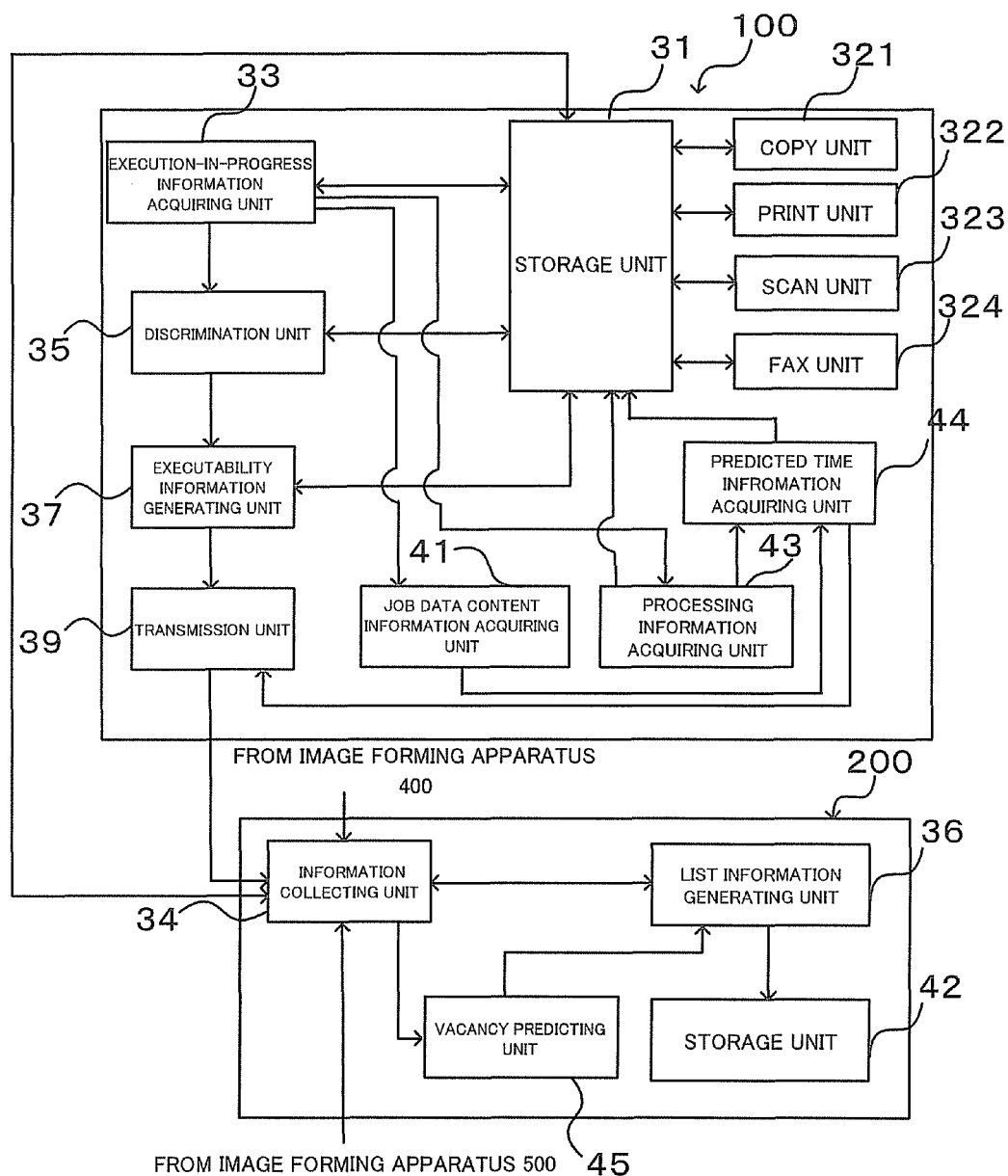
FIG. 14 shows functional blocks related to generation of executability list information according to a third embodiment.

Next, a third embodiment will be described. As shown in FIG. 14, the third embodiment includes a job data content information acquiring unit 41, a processing information acquiring unit 43, a predicted time information acquiring unit 44 and a vacancy predicting unit 45 in addition to the configuration described in the second embodiment. In the third embodiment, information about the speed of processing by each processing unit in the image forming apparatuses 100, 400 and 500 is assumed to be stored in the storage unit 31 of each apparatus.

The execution-in-progress information acquiring unit 33 transmits the acquired execution-in-progress function information also to the job data content information acquiring unit 41 and the processing information acquiring unit 43 in addition the discrimination unit 35. In the third embodiment, the execution-in-progress information acquiring unit 33 acquires information about the processing unit which is executing processing and information about job data identification ID which is information to specify job data as a target of execution, as the execution-in-progress function information from the execution status table.

The job data content information acquiring unit 41 acquires information about the content of job data as a target of execution in the first processing unit (for example, information about the data volume of a document in the job data), based on the record (log) stored in the storage unit 31, in each image forming apparatus. The job data content information acquiring unit 41 acquires the information about the content of the job data, based on the acquired execution-in-progress function information (more specifically the job data identification ID).

The processing information acquiring unit 43 acquires information about the speed of processing by the first processing unit that is executing, from the storage unit 31 based on the execution-in-progress function information. For example, the processing information acquiring unit 43 acquires the information about the speed of processing by the first processing unit per second from the storage unit 31.

The predicted time information acquiring unit 44 acquires information about time predicted to be required for the processing by the first processing unit to end (this time can also be considered to be time until the processing by the second processing unit becomes able to start; hereinafter this time is simply referred to as predicted time), based on the information about the content of the job data acquired by the job data content information acquiring unit 41 and the information about the speed of processing by the first processing unit that is executing, acquired by the processing information acquiring unit 43. More specifically, the predicted time information acquiring unit 44 calculates the predicted time based on the information about the data volume of the document in the job data and the information about the speed of processing by the first processing unit per second for each image forming apparatus. The predicted time information acquiring unit 44 stores information about the acquired predicted time in the storage unit 31 and notifies the transmission unit 39 that the information about the predicted time is acquired.

The transmission unit 39 transmits, to the information collecting unit 34, a notification that the information about the predicted time is acquired, in addition the notification of the generation of the executability information.

The information collecting unit 34 collects the executability information from each image forming apparatus, based on the notification of the generation of the executability information, and acquires the information about the calculated predicted time for the processing by the first processing unit from each image forming apparatus, based on the notification of the acquisition of the information about the predicted time.

The vacancy predicting unit 45 predicts an image forming apparatus in which the processing by the second processing unit becomes executable earlier than in the other image forming apparatuses in the system, based on the information about the predicted time in each image forming apparatus acquired by the information collecting unit 34.

The list information generating unit 36 generates executability list information including the result of the prediction by the vacancy predicting unit 45. For example, the list information generating unit 36 generates executability list information including information about an image forming apparatus that becomes able earlier to execute the processing by the copy unit 321 corresponding to the second processing unit, as shown in FIG. 15 as an example. In FIG. 15, the note section shows that the processing by the second processing unit becomes executable earlier in the image forming apparatus 100 than in the other image forming apparatuses.

Figure 16:
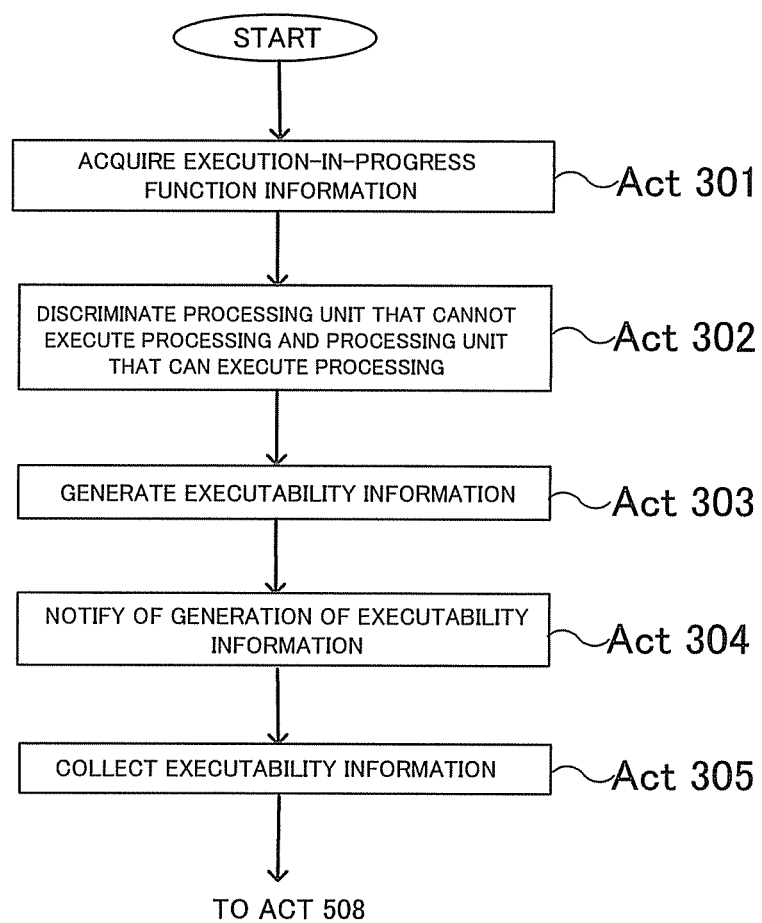
FIG. 16 shows a processing flow in generation of executability list information in the first embodiment.
Figure 17:
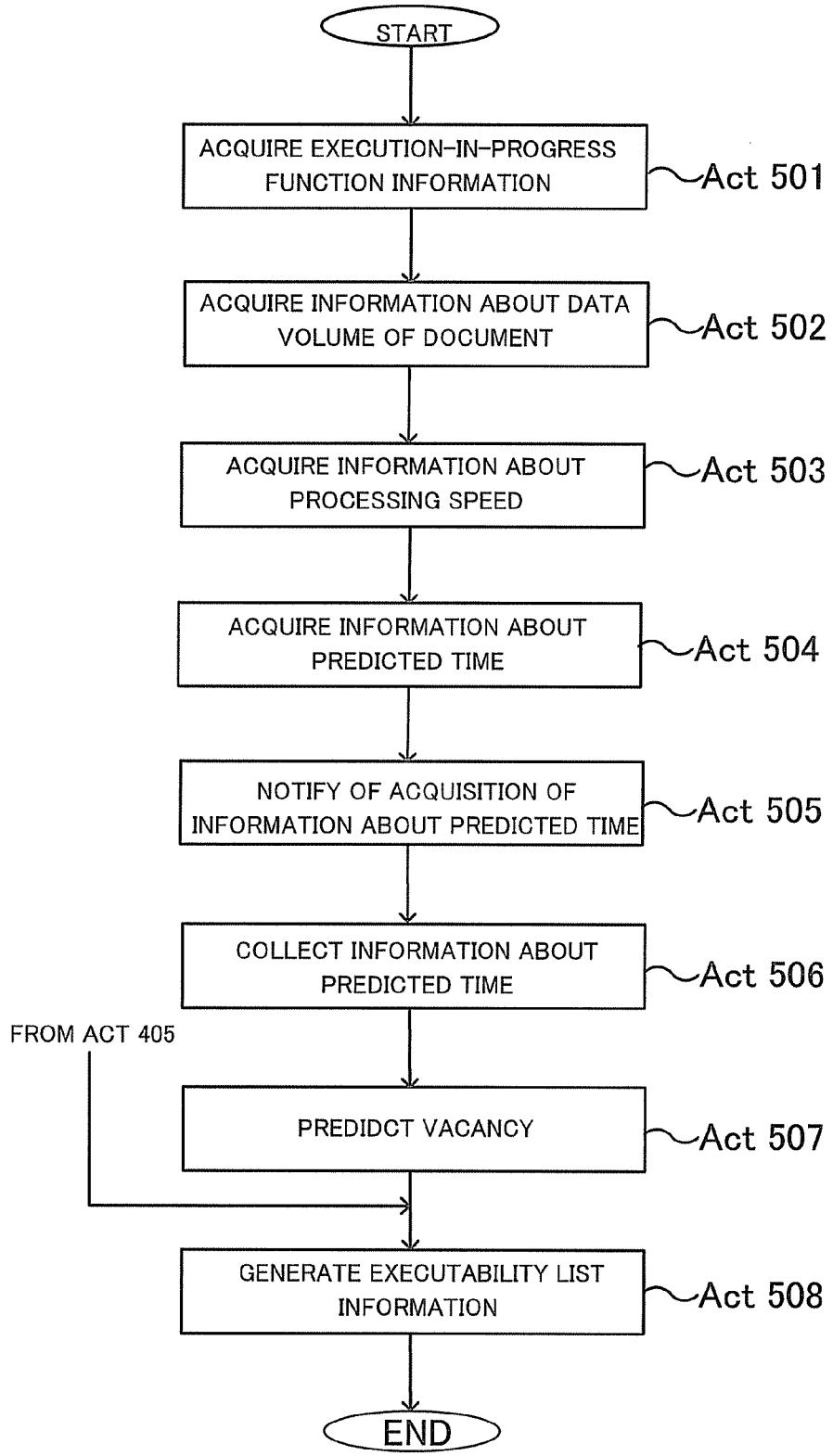
FIG. 17 shows a processing flow in generation of executability information in the first embodiment.

FIG. 16 shows a processing flow related to the generation and collection of executability information. FIG. 17 shows a processing flow related to the prediction of an image forming apparatus in which the processing by the second processing unit becomes executable earlier and the generation of executability information including the result of the prediction. The generation and collection of executability information shown in FIG. 16 (ACT 401 to ACT 405) is the same as ACT 301 to ACT 305 of FIG. 13 described in the second embodiment and therefore will not be described further in detail. The temporal order of the generation of executability information and the prediction of an image forming apparatus in which the processing by the second processing unit becomes executable earlier is not particularly specified and either may be carried out first.

First, in ACT 501, the execution-in-progress information acquiring unit 33 acquires execution-in-progress function information based on the execution status table stored in the storage unit 31. The execution-in-progress information acquiring unit 33 transmits the acquired execution-in-progress function information to the job data content information acquiring unit 41 and the processing information acquiring unit 43.

In ACT 502, the job data content information acquiring unit 41 acquires information about the data volume of a document as a target of processing by the first processing unit from the storage unit 31, using the execution-in-progress function information. The job data content information acquiring unit 41 transmits the acquired information about the data volume of the document as a target of processing by the first processing unit to the predicted time information acquiring unit 44.

In ACT 503, the processing information acquiring unit 43 acquires information about the speed of processing by the first processing unit from the storage unit 31, based on the acquired execution-in-progress function information. The processing information acquiring unit 43 transmits the information about the speed of processing to the predicted time information acquiring unit 44.

In ACT 504, the predicted time information acquiring unit 44 calculates predicted time using the information about the data volume of the document and the information about the speed of processing and thus acquires information about the predicted time. The predicted time information acquiring unit 44 stores the acquired information about the predicted time in the storage unit 31 and notifies the transmission unit 39 that the information about the predicted time is acquired.

In ACT 505, the transmission unit 39 notifies the information collecting unit 34 that the information about the predicted time is acquired, based on the notification from the predicted time information acquiring unit 44.

In ACT 506, the information collecting unit 34 collects the information about the predicted time from each image forming apparatus (more specifically, the storage unit 31 of each image forming apparatus). The information collecting unit 34 transmits the acquired information about the predicted time for each image forming apparatus, to the vacancy predicting unit 45.

In ACT 507, the vacancy predicting unit 45 compares the predicted time for each image forming apparatus using the acquired information about the predicted time for each image forming apparatus, and thus predicts an image forming apparatus in which the processing by the second processing unit becomes executable earlier than in the other image forming apparatuses (vacancy prediction). The vacancy predicting unit 45 transmits the result of the prediction to the list information generating unit 36.

In ACT 508, the list information generating unit 36 combines the result of the prediction by the vacancy predicting unit 45, for example, with information which associates the image forming apparatuses, the second processing unit in each image forming apparatus and the third processing unit in each image forming apparatus, and thus generates executability list information as shown in FIG. 15 as an example.

Thus, according to the third embodiment, the user can confirm an image forming apparatus in which processing that cannot be executed becomes executable early, from among the plural image forming apparatuses.

Other Embodiments

The first to third embodiments are described above. However, without being limited to these embodiments, other embodiments can also be employed, of course.

For example, executability information including the predicted time calculated by the predicted time information acquiring unit 44 described in the third embodiment may be generated. In this case, the executability information generating unit 37 acquires the predicted time from the predicted time information acquiring unit 44 and associates the predicted time with the processing by the first processing unit or the processing by the second processing unit, thus generating the executability information. FIG. 18 shows an example of the executability information.

In the third embodiment, the example in which the predicted time is calculated to acquire the information about the predicted time, using the information about the data volume of the document and the information about the speed of processing, is described. However, without being limited to this example, other forms can be taken. For example, a predicted time table for each processing unit associated with the data volume of document and the predicted time may be stored in the storage unit 31 of each image forming apparatus, and the predicted time information acquiring unit 44 may specify the predicted time based on the data volume of document, thus acquiring the information about the predicted time. Moreover, in the third embodiment, the data volume of the document in the job data is used as the information about the content of the job data. However, without being limited to this example, the information about the predicted time may be acquired, for example, using the type of document (raster data, vector data or the like).

In the second and third embodiments, the system having the three image forming apparatuses 100, 400 and 500 is described as an example. However, the system is not limited to these embodiments. For example, by registering the IP address of each image forming apparatus, it is possible to enable a new image forming apparatus to communicate with the PC 200 or the like and to add the image forming apparatus into the system. Moreover, by deleting the registered IP address, it is possible to delete the image forming apparatus from the system.

Moreover, in the second and third embodiments, the example in which executability list information is generated in the PC 200 is described. However, without being limited to this example, the executability list information may be generated in one of the image forming apparatuses within the system. In this case, the executability list information may be provided to the user via the monitor of the image forming apparatus in which this information is generated. Alternatively, the PC 200 may acquire the executability list information via the network from the image forming apparatus in which this information is generated.

In the first to third embodiments, the PC collects the executability information stored in the storage unit 31 of the image forming apparatus, based on the notification of the generation of the executability information (in the third embodiment, the executability information and the information about the predicted time). As another example the executability information generating unit 37 may store the generated executability information in the storage unit 31 and transmit the executability information to the transmission unit 39. Here, the transmission unit 39 transmits the executability information to the PC 200 together with a notification that the executability information is generated. Similarly, the predicted time information acquiring unit 44 may store the acquired information about the predicted time in the storage unit 31 and transmit the same information to the transmission unit 39. The transmission unit transmits the information about the predicted time to the PC 200 together with a notification that the information about the predicted time is generated.

In the third embodiment, the vacancy predicting unit 45 predicts the image forming apparatus in which the processing by the second processing unit becomes executable earlier than in the other image forming apparatuses within the system, and the list information generating unit 36 generates the executability list information including the result of the prediction. As another example, the vacancy predicting unit 45 may predict the image forming apparatus in terms of the processing by the first processing unit. That is, the vacancy predicting unit 45 may predict the image forming apparatus in which the processing by the first processing unit and/or the processing by the second processing unit becomes executable earlier than in the other image forming apparatuses within the system, based on the information about the predicted time for each image forming apparatus acquired by the information collecting unit 34. Moreover, the list information generating unit 36 may generate executability list information, for example, as shown in FIG. 19. In FIG. 19, the information includes the result of the prediction by the vacancy predicting unit 45 in terms of the processing by the first processing unit as well as the processing by the second processing unit. That is, the list information generating unit 36 may generate executability list information including the result of the prediction by the vacancy predicting unit 45 in terms of the processing by the first processing unit and/or the processing by the second processing unit. The forms of displaying the executability list information generated by the list information generating unit 36 include not only displaying the information within one screen but also separately displaying the result of prediction, for example, as shown in FIG. 20 (for example, displaying as a pop-up). The result of prediction shown as an example in FIG. 20 may be displayed by the PC 200 acquiring a display request from the user.

Moreover, a program that causes one or plural computers constituting the image forming system of the first to third embodiments to execute each of the above operations can be provided as an information generating program. In the first to third embodiments, the example in which the program is recorded in advance in a storage area provided within the apparatus is described. However, without being limited to this example, a similar program may be downloaded to the apparatus from a network, or a computer-readable recording medium in which a similar program is stored may be installed in the apparatus. The recording medium may be any form of recording medium in which the program can be stored and which is computer-readable. Specifically, the recording medium may be, for example, an internal storage device that is internally installed in a computer such as ROM or RAM, a portable storage medium such as CD-ROM, flexible disk, DVD disk, magneto-optical disk or IC card, a database that holds a computer program, another computer and its database, a transmission medium on a channel, or the like. The functions thus acquired by installation or download may be realized in cooperation with the OS (operating system) within the apparatus.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus, system and methods described herein may be made without departing from the spirit of the inventions. The accompanying claims and their equivalents are intended to cover such forms or modifications as would fall within the scope and spirit of the inventions.

As described above in detail, according to the technique described herein, when an image forming apparatus is executing certain functional processing, processing that cannot be executed because of the fact that the certain functional processing is being executed can be confirmed.

What is claimed is:

1. An image forming apparatus comprising:
plural processing units which execute plural processing functions that are different from each other;
   an execution-in-progress information acquiring unit which acquires execution-in-progress function information that is information about a first processing unit which is executing processing, of the plural processing units;
   a discrimination unit which discriminates a second processing unit that cannot execute processing when the first processing unit indicated by the execution-in-progress function information acquired by the execution-in-progress information acquiring unit is executing processing, from among the plural processing units; and
   an executability information generating unit which generates inexecutable function information that is information about the second processing unit, based on a result of determination by the discrimination unit;

wherein the discrimination unit discriminates the second processing unit for each of the image forming apparatuses, using the execution-in-progress function information and non-executability correspondence information that associates a predetermined processing unit and a processing unit that cannot execute processing when the predetermined processing unit is executing processing;

wherein the discrimination unit further discriminates, for each of the image forming apparatuses, a third processing unit that can execute processing when the first processing unit is executing processing, from among the plural processing units provided in each image forming apparatus, using the execution-in-progress function information and the non-executability correspondence information;

the executability information generating unit further generates executable function information that is information about the third processing unit, for each image forming apparatus, based on the result of determination by the discrimination unit, the executability information collecting unit further collects the executable function information for each of the image forming apparatuses, and the list information generating unit generates the executability list information showing the plural image forming apparatuses, processing by the second processing unit in each of the image forming apparatuses, and processing by the third processing unit in each of the image forming apparatuses, in association with each other, using the inexecutable function information and the executable function information for each of the image forming apparatuses collected by the executability information collecting unit.

2. The apparatus according to claim 1, wherein the discrimination unit discriminates the second processing unit, using the execution-in-progress function information and non-executability correspondence information that associates a predetermined processing unit and a processing unit that cannot execute processing when the predetermined processing unit is executing processing.

3. The apparatus according to claim 2, wherein the discrimination unit further discriminates a third processing unit that can execute processing when the first processing unit is executing processing, from among the plural processing units, using the execution-in-progress function information and the non-executability correspondence information, and the executability information generating unit further generates executable function information that is information about the third processing unit, based on the result of determination by the discrimination unit.

4. The apparatus according to claim 1, further comprising a job data content information acquiring unit which acquires information about a content of job data that is a target of execution by the first processing unit; and a predicted time information acquiring unit which acquires information about time predicted to be required for processing by the second processing unit to become executable, using the information about the content of the job data acquired by the job data content information acquiring unit.

5. An image forming system having plural image forming apparatuses which have plural processing units that execute different processing functions from each other, the system comprising:

an execution-in-progress information acquiring unit which acquires execution-in-progress function information that is information about a first processing unit that is executing processing, of the plural processing units, in association with each image forming apparatus;

a discrimination unit which discriminates, for each image forming apparatus, a second processing unit that cannot execute processing when the first processing unit indicated by the execution-in-progress function information acquired by the execution-in-progress information acquiring unit is executing processing, from among the plural processing units provided in each image forming apparatus;

an executability information generating unit which generates inexecutable function information that is information about the second processing unit, in association with each image forming apparatus, based on a result of determination by the discrimination unit;

an executability information collecting unit which collects the inexecutable function information for each of the plural image forming apparatuses generated by the executability information generating unit; and a list information generating unit which generates executability list information showing the plural image forming apparatuses and processing by the second processing unit in each of the image forming apparatuses in association with each other, using the inexecutable function information for each of the image forming apparatuses collected by the executability information collecting unit;

wherein the discrimination unit discriminates the second processing unit for each of the image forming apparatuses, using the execution-in-progress function information and non-executability correspondence information that associates a predetermined processing unit and a processing unit that cannot execute processing when the predetermined processing unit is executing processing wherein the discrimination unit further discriminates, for each of the image forming apparatuses, a third processing unit that can execute processing when the first processing unit is executing processing, from among the plural processing units provided in each image forming apparatus, using the execution-in-progress function information and the non-executability correspondence information, the executability information generating unit further generates executable function information that is information about the third processing unit, for each image forming apparatus, based on the result of determination by the discrimination unit, the executability information collecting unit further collects the executable function information for each of the image forming apparatuses, and the list information generating unit generates the executability list information showing the plural image forming apparatuses, processing by the second processing unit in each of the image forming apparatuses, and processing by the third processing unit in each of the image forming apparatuses, in association with each other, using the inexecutable function information and the executable function information for each of the image forming apparatuses collected by the executability information collecting unit.

6. The apparatus according to claim 5, further comprising:
a job data content information acquiring unit which acquires information about content of job data that is a target of execution by the first processing unit, for each image forming apparatus;

a predicted time information acquiring unit which acquires information about predicted time that is time predicted to be required for processing by the second processing unit to become executable, for each image forming apparatus, using the information about the content of the job data acquired by the job data content information acquiring unit; and a vacancy predicting unit which predicts the image forming apparatus in which the processing by the second processing unit becomes executable earlier than in the other image forming apparatuses within the system, using the information about the predicted time for each image forming apparatus acquired by the predicted time information acquiring unit.

7. The apparatus according to claim 6, wherein the list information generating unit generates the executability list information further including a result of prediction by the vacancy predicting unit about the image forming apparatus in which the processing by the second processing unit becomes executable earlier than in the other image forming apparatuses within the system.

8. The apparatus according to claim 5, further comprising a job data content information acquiring unit which acquires information about a content of job data that is a target of execution by the first processing unit, for each image forming apparatus;

a predicted time information acquiring unit which acquires information about predicted time that is time predicted to be required for processing by the first processing unit to become executable, for each image forming apparatus, using the information about the content of the job data acquired by the job data content information acquiring unit; and a vacancy predicting unit which predicts the image forming apparatus in which the processing by the first processing unit becomes executable earlier than in the other image forming apparatuses within the system, using the information about the predicted time for each image forming apparatus acquired by the predicted time information acquiring unit.

9. The apparatus according to claim 8, wherein the list information generating unit generates the executability list information further including a result of prediction by the vacancy predicting unit about the image forming apparatus in which the processing by the first processing unit becomes executable earlier than in the other image forming apparatuses within the system.

10. An information generating method for plural image forming apparatuses which have plural processing units that execute different processing functions from each other, the method comprising:

acquiring execution-in-progress function information that is information about a first processing unit that is executing processing, of the plural processing units, in association with each image forming apparatus;

discriminating, for each image forming apparatus, a second processing unit that cannot execute processing when the first processing unit indicated by the acquired execution-in-progress function information is executing processing, from among the plural processing units provided in each image forming apparatus;

generating inexecutable function information that is information about the second processing unit, in association with each image forming apparatus, based on a result of determination;

collecting the generated inexecutable function information for each of the plural image forming apparatuses; and generating executability list information showing the plural image forming apparatuses and processing by the second processing unit in each of the image forming apparatuses in association with each other, using the collected inexecutable function information for each of the image forming apparatuses;

wherein the second processing unit is discriminated for each of the image forming apparatuses, using the execution-in-progress function information and non-executability correspondence information that associates a predetermined processing unit and a processing unit that cannot execute processing when the predetermined processing unit is executing processing;

wherein a third processing unit that can execute processing when the first processing unit is executing processing is further discriminated for each of the image forming apparatuses from among the plural processing units provided in each image forming apparatus, using the execution-in-progress function information and the non-executability correspondence information;

executable function information that is information about the third processing unit is further generated for each image forming apparatus, based on the result of determination;

the executable function information for each of the image forming apparatuses is further collected, and the executability list information showing the plural image forming apparatuses;

processing by the second processing unit in each of the image forming apparatuses and processing by the third processing unit in each of the image forming apparatuses in association with each other is generated, using the inexecutable function information and the executable function information for each of the image forming apparatuses that are collected.

11. The apparatus according to claim 10, wherein information about a content of job data that is a target of execution by the first processing unit is acquired for each image forming apparatus, information about predicted time that is time predicted to be required for processing by the second processing unit to become executable is acquired for each image forming apparatus, using the acquired information about the content of the job data, and the image forming apparatus in which the processing by the second processing unit becomes executable earlier than in the other image forming apparatuses within the system is predicted, using the acquired information about the predicted time for each image forming apparatus.

12. The apparatus according to claim 11, wherein the executability list information further including a result of prediction about the image forming apparatus in which the processing by the second processing unit becomes executable earlier than in the other image forming apparatuses within the system is generated.

13. The apparatus according to claim 10, wherein information about a content of job data that is a target of execution by the first processing unit is acquired for each image forming apparatus, information about predicted time that is time predicted to be required for processing by the first processing unit to become executable is acquired for each image forming apparatus, using the acquired information about the content of the job data, and the image forming apparatus in which the processing by the first processing unit becomes executable earlier than in the other image forming apparatuses within the system is predicted, using the acquired information about the predicted time for each image forming apparatus.

14. The apparatus according to claim 13, wherein the executability list information further including a result of prediction about the image forming apparatus in which the processing by the first processing unit becomes executable earlier than in the other image forming apparatuses within the system is generated.

* * * * *